(12) United States Patent
Zhang et al.

(10) Patent No.: US 11,676,399 B1
(45) Date of Patent: Jun. 13, 2023

(54) OBJECT TRACKING

(71) Applicant: Motional AD LLC, Boston, MA (US)

(72) Inventors: Chengjie Zhang, Wexford, PA (US);
Lingji Chen, Littleton, MA (US);
Christopher Svoboda, Burlington, MA (US)

(73) Assignee: MOTIONAL AD LLC., Boston, MA (US)

( * ) Notice: Subject to any disclaimer, the term of this patent is extended or adjusted under 35 U.S.C. 154(b) by 0 days.

(21) Appl. No.: 17/866,743

(22) Filed: Jul. 18, 2022

(51) Int. Cl.
*G06V 20/58* (2022.01)
*G01S 13/72* (2006.01)
*G01S 13/52* (2006.01)

(52) U.S. Cl.
CPC .............. *G06V 20/58* (2022.01); *G01S 13/52* (2013.01); *G01S 13/726* (2013.01)

(58) Field of Classification Search
CPC ...... G06V 20/58; G06V 10/82; G06V 10/764; G01S 13/52; G01S 13/723; G06N 3/045; G06N 3/08; G06N 3/084; G06N 20/00; G06N 3/04; G06N 7/01; G05D 1/0088; G05D 1/0221; G05D 2201/0213; G05D 1/00; B60W 30/09; B60W 30/0956
See application file for complete search history.

(56) References Cited

U.S. PATENT DOCUMENTS

| | | | |
|---|---|---|---|
| 10,621,448 B2 * | 4/2020 | Schubert | B60W 60/001 |
| 10,962,973 B2 * | 3/2021 | Kazemi | B62D 15/025 |
| 11,537,134 B1 * | 12/2022 | Wiest | G05D 1/0088 |
| 2017/0034470 A1 * | 2/2017 | Kleinrock | H04N 23/661 |
| 2020/0249674 A1 * | 8/2020 | Dally | G05D 1/0088 |
| 2021/0009163 A1 * | 1/2021 | Urtasun | G01C 21/3626 |
| 2021/0103757 A1 * | 4/2021 | Jang | G06V 10/426 |
| 2021/0157282 A1 * | 5/2021 | Abeloe | G06N 3/082 |
| 2021/0183238 A1 * | 6/2021 | Guo | G06T 7/12 |
| 2021/0303911 A1 * | 9/2021 | Li | G06V 20/56 |

(Continued)

OTHER PUBLICATIONS

"SCOUT: Socially-COnsistentand UndersTandable Graph Attention Network for Trajectory Prediction ofVehicles and VRUs"; S. Carrasco, 2021 IEEE Intelligent Vehicles Symposium (IV) Jul. 11-17, 2021. Nagoya, Japan (Year: 2021).*

(Continued)

*Primary Examiner* — Michael S Osinski
(74) *Attorney, Agent, or Firm* — Mintz Levin Cohn Ferris Glovsky and Popeo, P.C.

(57) ABSTRACT

Provided are methods for object tracking, which can include receiving sensor data characterizing respective detected objects. The methods can also include generating a data structure based on the data characterizing the respective detected objects. The data structure can include a graph of nodes representing states of the objects and edges representing hypothetical transitions in states of the objects. The methods can also include applying a predictive model to the data structure. The predictive model can be trained to receive the state as inputs and produce an identification of a set of nodes and edges corresponding to the one of the respective detected objects. The methods can further include providing data based on the identification of the set of nodes and edges to a planning system of the vehicle and causing the vehicle to operate based on providing the data. Systems and computer program products are also provided.

20 Claims, 9 Drawing Sheets

(56) References Cited

U.S. PATENT DOCUMENTS

| | | | |
|---|---|---|---|
| 2021/0311728 A1* | 10/2021 | Raiskin | G06F 40/143 |
| 2022/0188356 A1* | 6/2022 | Jorgensen | G06F 16/75 |
| 2022/0261601 A1* | 8/2022 | Amato | G06N 7/01 |
| 2022/0274625 A1* | 9/2022 | Garimella | B60W 30/09 |
| 2022/0353455 A1* | 11/2022 | Kleinrock | H04N 23/62 |

OTHER PUBLICATIONS

"RSG-Net: Towards Rich Sematic Relationship Prediction for Intelligent Vehicle in Complex Environments"; Yafu Tian, 2021 IEEE Intelligent Vehicles Symposium (IV) Jul. 11-17, 2021. Nagoya, Japan (Year: 2021).*

* cited by examiner

OBJECT TRACKING

BACKGROUND

An autonomous vehicle may be capable of sensing its surrounding environment and navigating to a goal location with minimal to no human input. In order to safely traverse a selected path while avoiding obstacles that may be present along the way, the vehicle may rely on various types of sensor data to detect objects to be avoided. For example, the sensor data can be associated with a vehicle or a pedestrian moving relative to the vehicle. The ability to determine and track objects accurately can be reduced in crowded or highly occluded environments.

DETAILED DESCRIPTION

Figure 1:
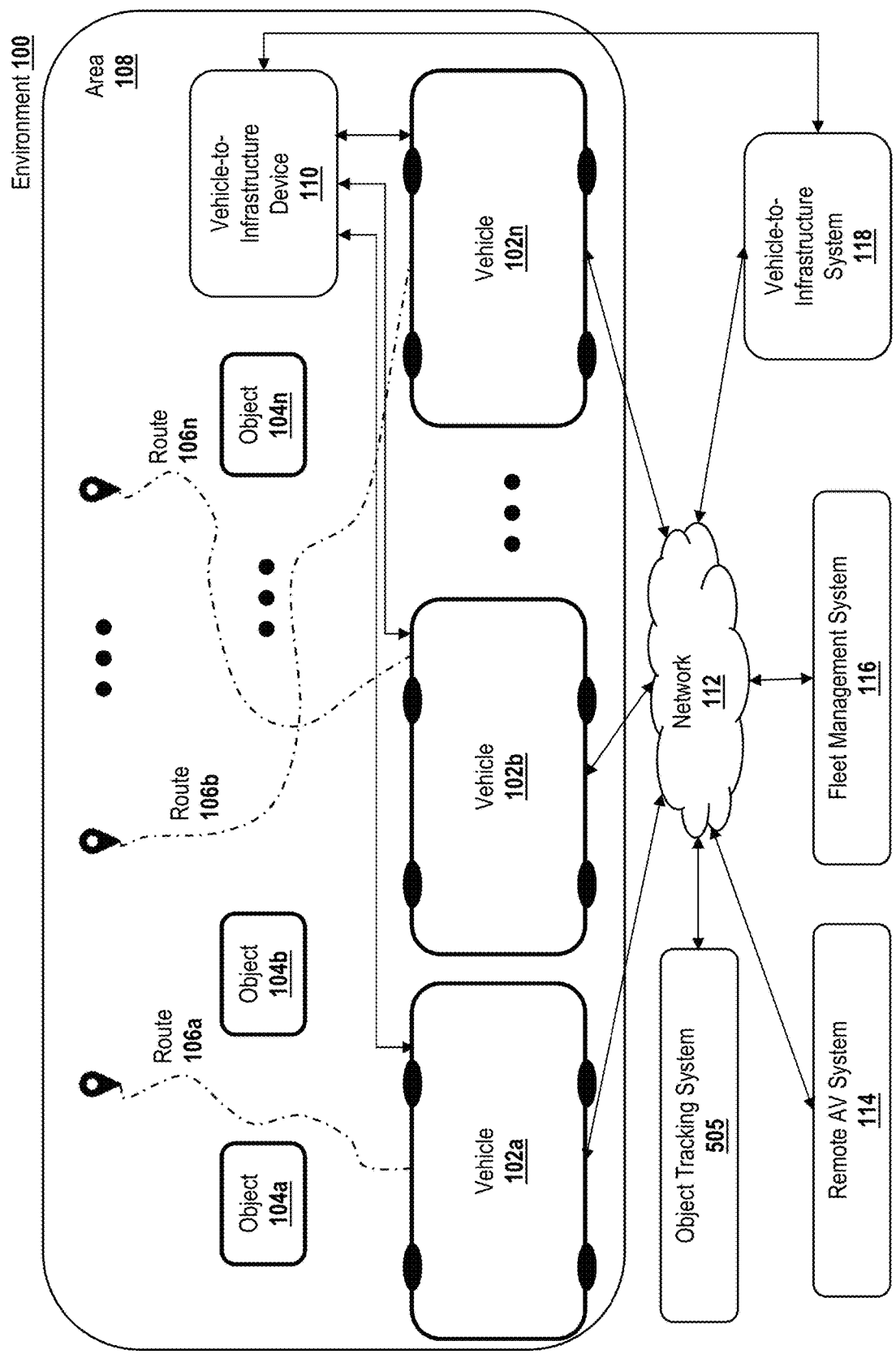
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement object tracking for objects present in an environment in which an autonomous vehicle is operating. The embodiments herein provide systems, methods, and computer program products for receiving data characterizing an object detected by sensors of the vehicle. Based on the sensor data, a data structure corresponding to a state and a hypothetical transition or change in the state can be generated. For example, the state can be represented as nodes in the data structure and can include a velocity, a heading, and/or a physical appearance of the object. The hypothetical transition in state of the object can be represented as edges or links connecting two nodes of the data structure and can correspond to changes in the state of the object between two or more instances of time at which the object was detected by the sensors. A predictive model can be applied to the data structure to produce an identification of a set of nodes and edges corresponding to the detected object. The identification can correspond to a trajectory of the object in the environment shared with the vehicle and can be provided to a planning system of the vehicle. The vehicle can be operated based on the identification (or trajectory) of the detected object.

By virtue of the implementation of systems, methods, and computer program products described herein, the techniques for object detection can provide improved accuracy in object state determination by minimizing cost functions in state transitions over a user-defined temporal period as compared to an entire history of acquired sensors data. As a result, computational processing can be reduced and the need for specialized computing equipment in the vehicle can be minimized. Because the processing is performed over a user-defined temporal period, errors do not accumulate and improper data elements generated during the state determination can be replaced dynamically. The resulting data structure used to determine object state can thus be improved and identification of moving objects vs. static objects can be more robust. This can provide the vehicle with more accurate object state information of its operating environment and can allow the planning system of the vehicle to plan routes with greater precision and less likelihood of contact, or even collision, with a detected object.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100. In some embodiments, a goal determination system 505 can be included in the environment 100. The object tracking system 505 can be configured within a vehicle 102 or external to a vehicle 102. In some embodiments, first portions of the object tracking system 505 can be configured within a vehicle 102 and second portions of the object tracking system 505 can be configured external to a vehicle 102.

Figure 2:
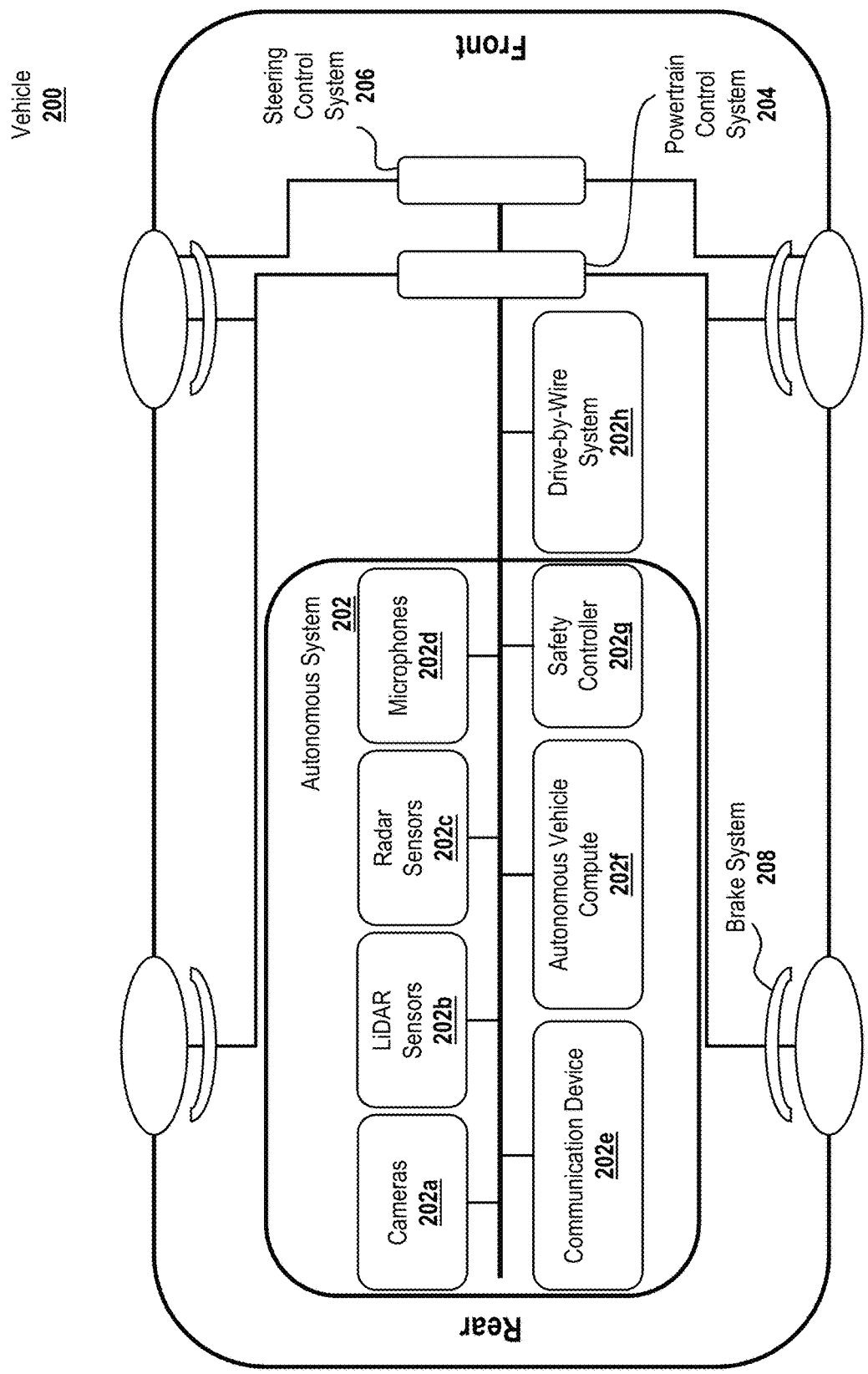
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 can correspond to any one of vehicles 102. In some embodiments, vehicles 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
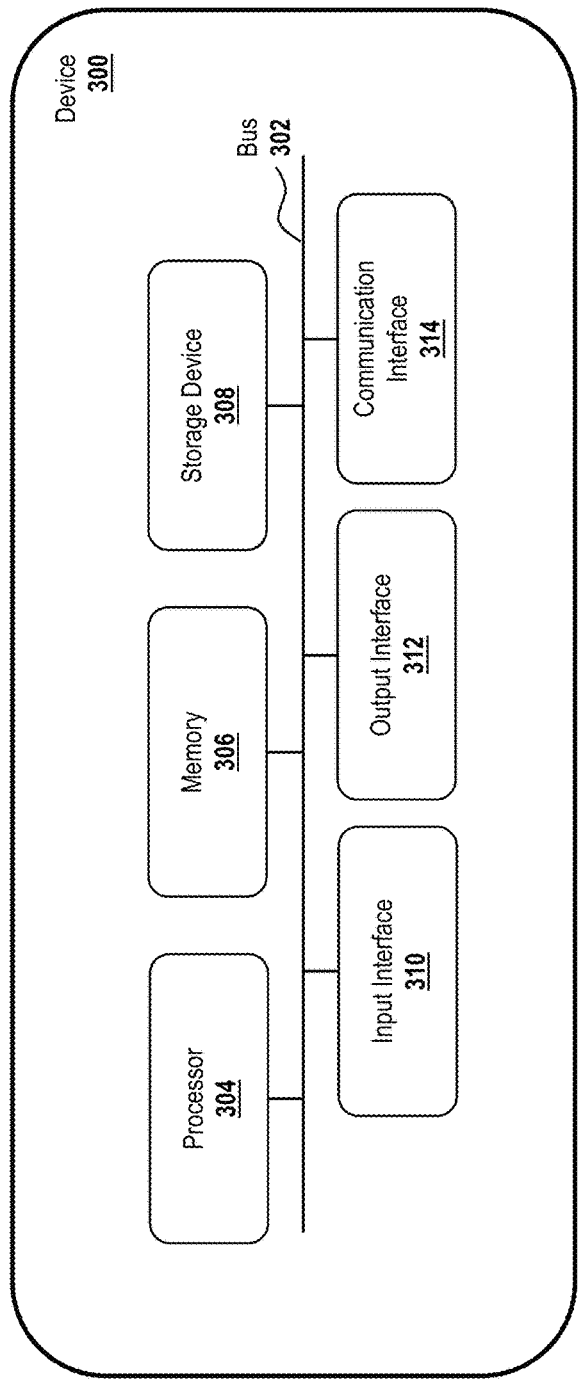
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of the object tracking system 505, and/or one or more devices of network 112 (e.g., one or more devices of a system of network 112). In some embodiments, one or more devices of vehicles 102 (e.g., one or more devices of a system of vehicles 102), one or more devices of the object tracking system 505, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
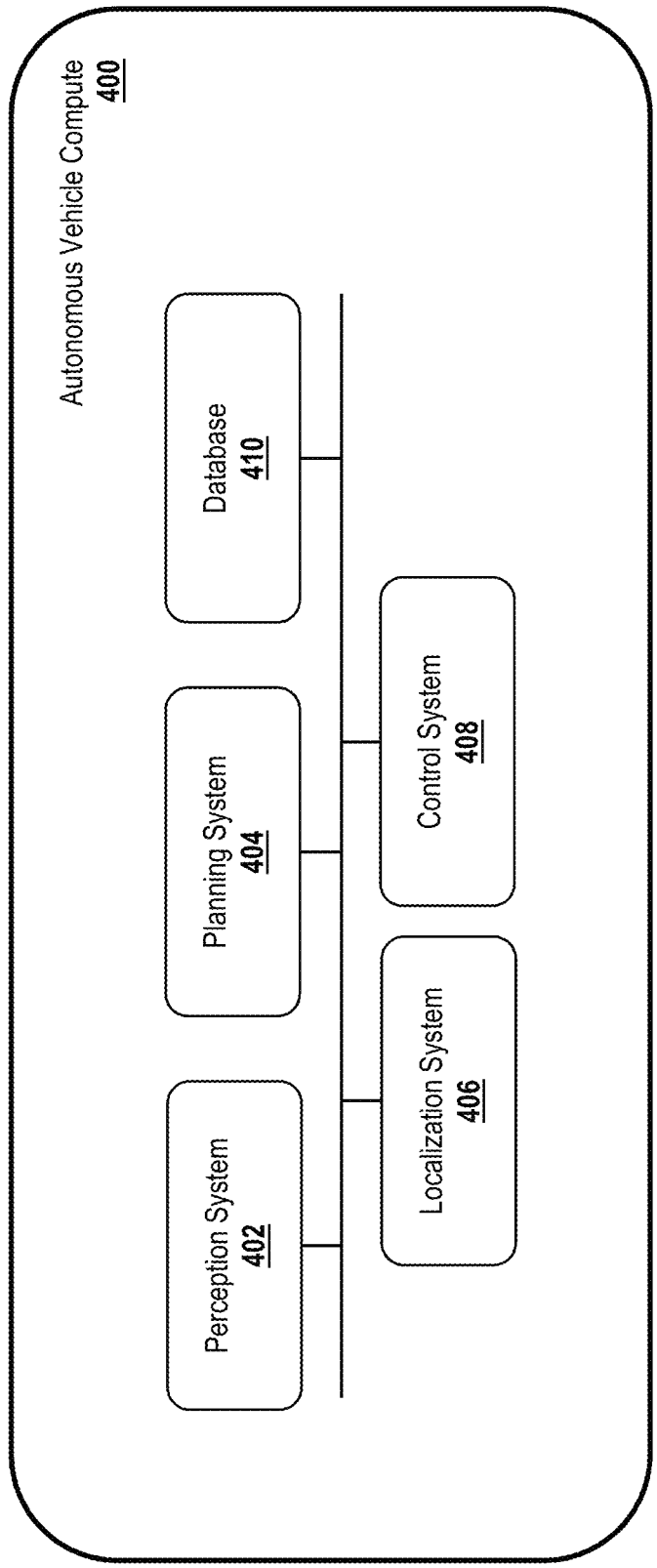
FIG. 4A is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, control system 408, and/or the object tracking system 505 implement at least one machine learning model alone or in combination with one or more of the above-noted systems. In some examples, perception system 402, planning system 404, localization system 406, control system 408, and/or the object tracking system 505 implement at least one machine learning model as part of a pipeline (e.g., a pipeline for identifying one or more objects located in an environment and/or the like). An example of an implementation of a machine learning model is included below with respect to FIG. 4B.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
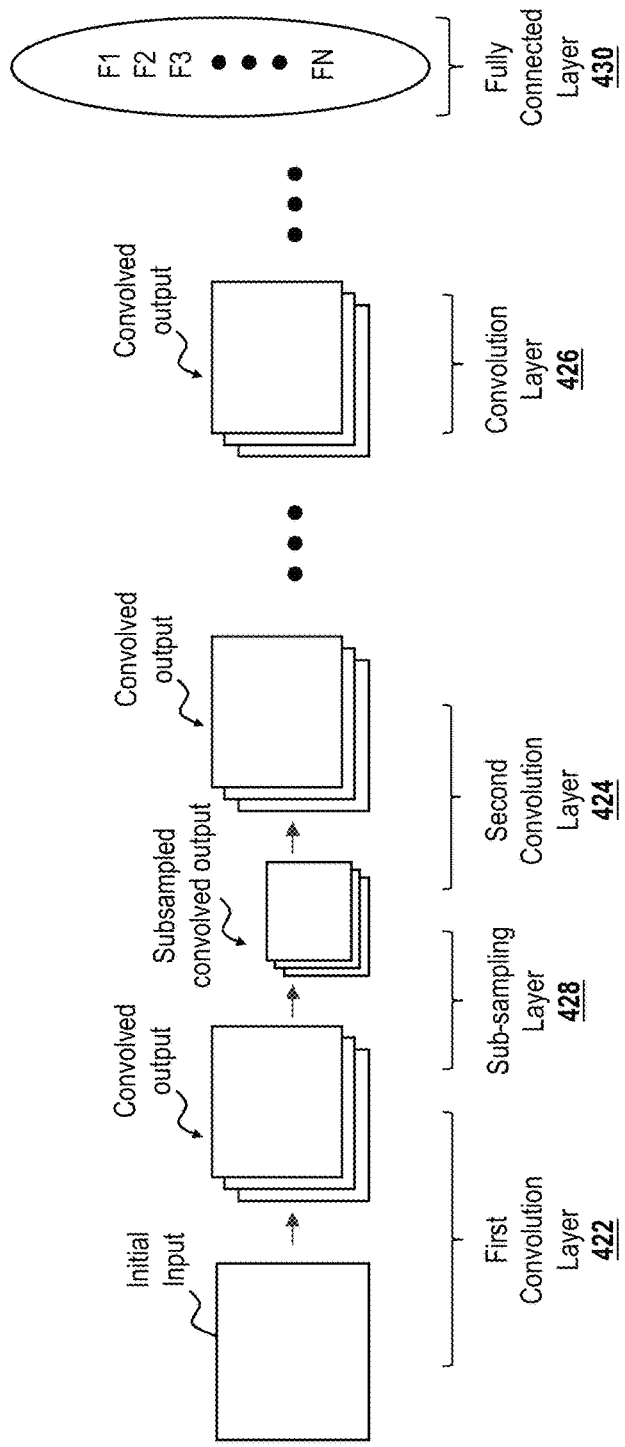
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, control system 408, and/or the object tracking system 505. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 5:
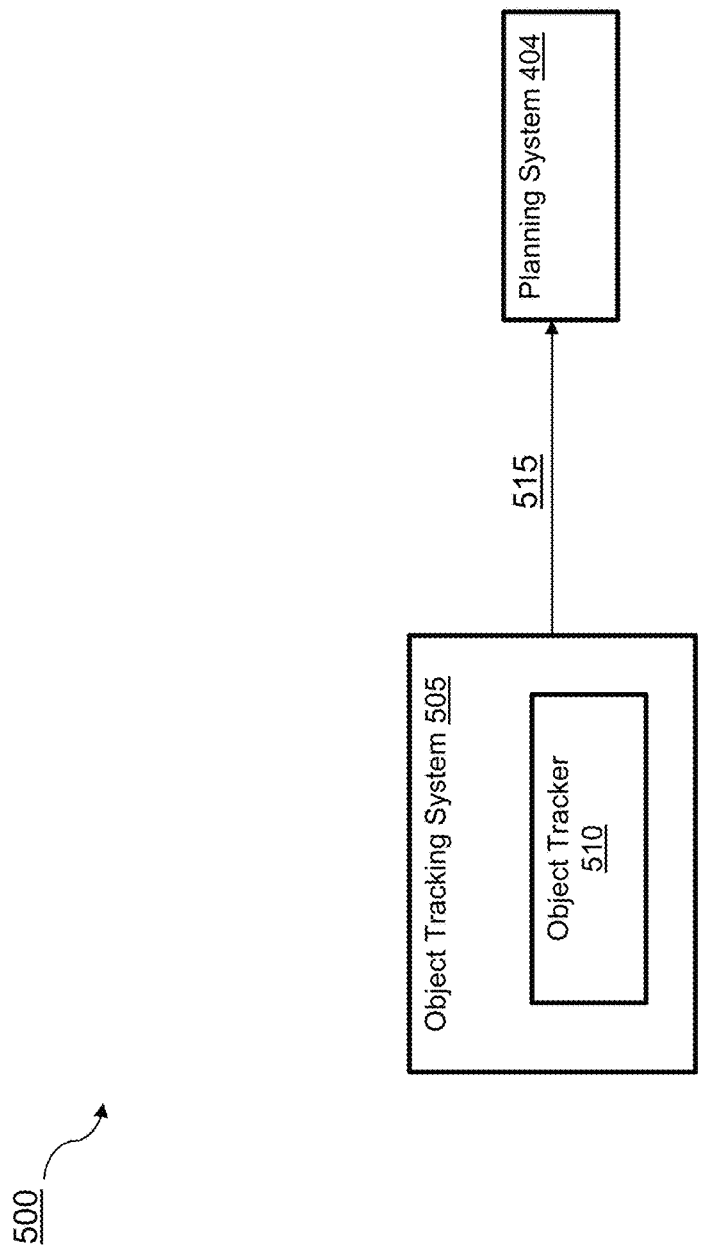
FIG. 5 is a diagram of an implementation of a process for object tracking.

Referring now to FIG. 5, illustrated is a diagram of an implementation 500 of a process for object tracking using sensor data. In some embodiments, implementation 500 includes object tracking system 505, vehicles 102*a*-102*n* and/or vehicles 200, objects 104*a*-104*n*, routes 106*a*-106*n*, area 108, vehicle-to-infrastructure (V2I) device 110, network 112, remote autonomous vehicle (AV) system 114, fleet management system 116, and/or V2I system 118. In some embodiments, object tracking system 505 includes, forms a part of, is coupled to, and/or uses vehicles 102*a*-

102n and/or vehicles 200, objects 104a-104n, routes 106a-106n, area 108, vehicle-to-infrastructure (V2I) device 110, network 112, remote autonomous vehicle (AV) system 114, fleet management system 116, and/or V2I system 118.

As shown in FIG. 5, the implementation 500 includes an object tracking system 505. The object tracking system 505 includes an object tracker 510 configured to acquire and process sensor data from one or more sensors 202 affixed to the vehicle. In some embodiments, the sensor data is used to determine and provide trajectories of objects within an environment in which the vehicle is co-located. Based on the received sensor data, the object tracker 510 determines hypothetical object trajectories 515, which are provided to the planning system 404 for use in autonomously navigating the vehicle with respect to the detected object. For example, the trajectory of the vehicle is determined by the planning system 404 so as to avoid or otherwise navigate away from or with respect to the object trajectories 515 determined by the object tracking system 505.

Figure 6:
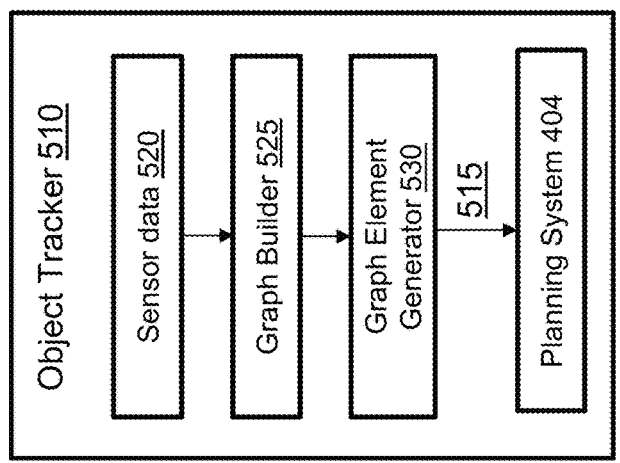
FIG. 6 is a diagram of a detailed implementation of an object tracking system.

Referring now to FIG. 6, illustrated is a diagram of a detailed implementation of the object tracking system 505 of FIG. 5. As shown in FIG. 6, the object tracking system 505 includes an object tracker 510. The object tracker 510 receives sensor data 520 from any one of sensors 202. The sensor data 520 is processed by a graph builder 525 to form a data structure of nodes and edges corresponding to one or more detected objects associated with the sensor data 520. In some embodiments, the data structure is a graph. A node of the data structure corresponds to a state of a detected object at a particular time, such as a velocity, a heading, or a physical appearance of the object. An edge connecting two nodes corresponds to a hypothetical transition in state of the object between a first instance of time and second instance of time.

For example, a data structure is formed based on sensor data associated with a pedestrian walking in proximity of an intersection the vehicle is approaching. A node is associated with the speed, direction, and appearance of the pedestrian. An edge is associated with a hypothetical change in the pedestrian's speed, direction, or appearance. For example, a hypothetical change in the pedestrian's direction can be associated with the pedestrians continued travel outside of the intersection or the pedestrian's change in travel into the intersection.

The graph builder 525 implements a processing window parameter configured to build the graph in relation to sensor data 520 that is associated with a user-defined amount of time. For example, the processing window parameter is configured as 1 or 2 seconds in length and the graph builder constructs the data structure based on sensor data acquired over the previous 1 or 2 seconds. Advantageously, the use of a processing window parameter corrects for previously erroneous states or state transitions because previous incorrect state or state transition determinations do not incorrectly influence a subsequent state or state transition determination. This enables the graph builder 525 to operate with conditional independence such that a current state or state transition is determined based on a partial past history (e.g., corresponding to a value of the processing window parameter) and not a longer history for which the sensor data 520 was collected. In some embodiments, the processing window parameter can be 0.5, 1.0, 1.5, 2.0, 2.5, 3.0, 3.5, 4.0, 4.5, or 5.0 seconds in length.

As new sensor data 520 is acquired, it can be provided to the graph builder 525 and a new data structure, e.g., a new graph, can be formed. Thus, as new detection instances are captured by the sensor data 520, new nodes and new edges are determined and configured in the data structure so as to update the graph in a streaming manner.

In some embodiments, the sensor data 520 includes data from different sensing modalities, such as data from cameras 202a, LiDAR sensors 202b, radar sensors 202c, microphones 202d, or a combination thereof. As a result, processing the sensor data 520 from different modalities creates out-of-sequence sensor data that is not temporally consistent from a first time instance to a subsequent time instance. To address this condition the graph builder 525 is configured to detect sensor data associated with an earlier graph state as compared to an initial or starting graph state. Responsive to the detecting, the graph builder 525 determines a new node position of the object and inserts a new node into the determined new node position. The graph builder 525 then reorders and sort the graph based on the new node position.

The data structure or graph built by the graph builder 525 is provided to the graph element generator 530. The graph element generator is configured with a predictive model, such as CNN 420, configured to receive the state (e.g., at least one of a velocity, a heading, and/or a physical appearance of the detected object) as an input and to generate as an output a set of at least one node and at least one edge associated with the object for which the input of state was received. The predictive model is configured to solve the output by linear assignment to minimize costs. The cost is considered to be the measured distance between the state and transition of state at a past time as compared to a current time. For example, the measured distance between states can be associated with a magnitude of changes in the speed, heading, and/or appearance of the sensed object. Thus, a greater cost is indicative of larger changes in the object's state and permitting larger costs to persist can lead to inaccurate predicted object state transitions. Jointly solving the assignment for all object detections at any point in time minimizes the distance for all object detections and thus, output the new state and hypothetical new state more robustly and more accurately. In some embodiments, the graph element generator 530 is tuned using different motion models.

As the graph element generator 530 identifies new nodes and edges based on the state of the detected object a trajectory of the object is formed as a best estimate of the object in time. In some embodiments, the newly identified nodes and edges are provided to a smoothing function improve state accuracy and state transition accuracy. For example, in some embodiments, the smoothing function includes a Kalman filter. In some embodiments, the Kalman filter is applied to output nodes and edges associated with new state and state transitions of a detected moving object. In some embodiments, the smoothing function includes a Kalman filter in conjunction with a static object motion model to output nodes and edges associated with new state and state transitions of a detected static object. A trajectory 515 is formed based on tracks associated with the incremental changes in nodes (e.g., object state) and edges (e.g., hypothetical changes in state of the object) as the object is detected by the sensors through time.

The trajectory 515 is provided to the vehicle planning system 404 and the vehicle is operated to navigate to the vehicle in relation to the trajectories 515 corresponding to objects 104.

Figure 7:
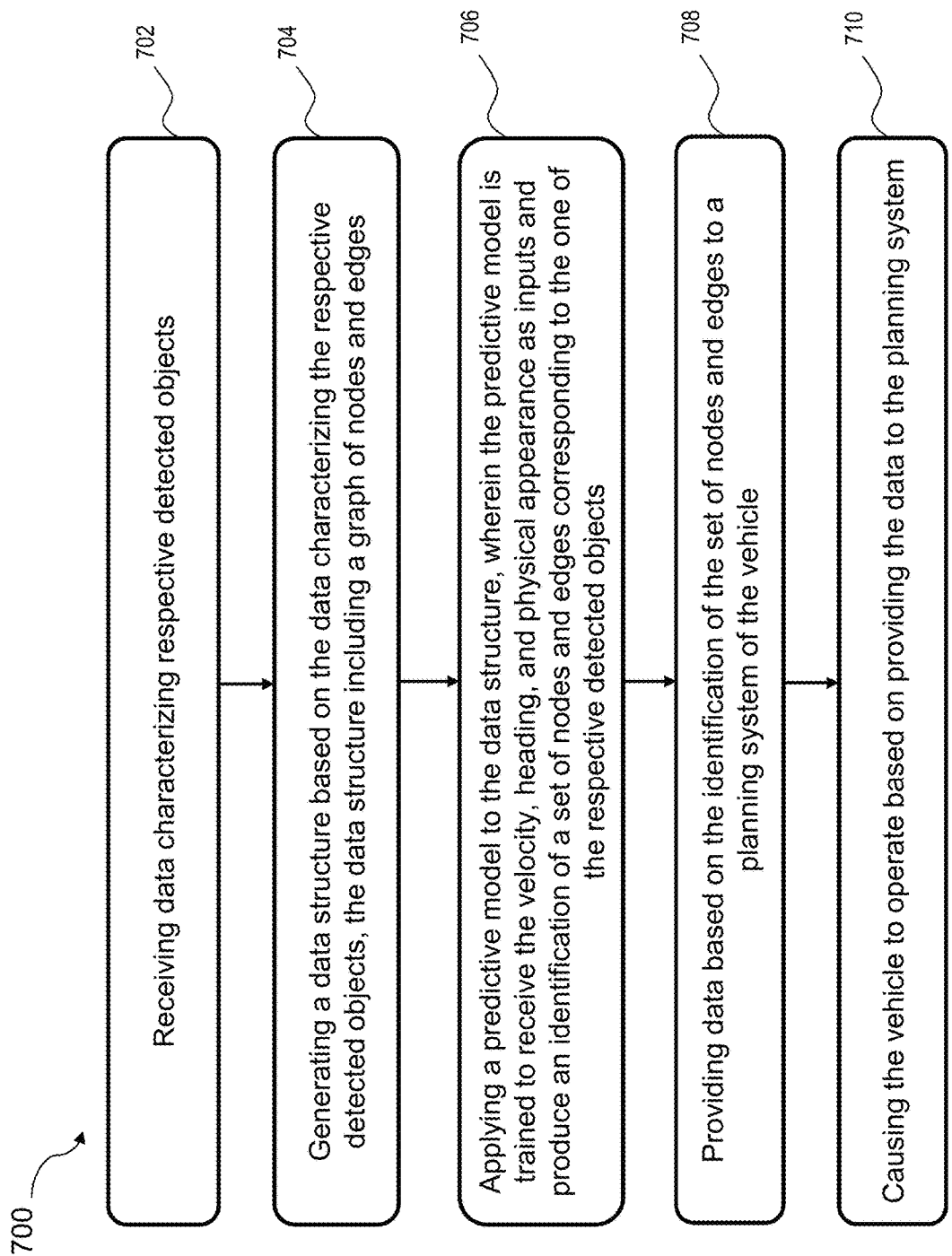
FIG. 7 is a flowchart of a process for object tracking.

Referring now to FIG. 7, illustrated is a flowchart of a process 700 for object tracking using the object tracking system described herein. In some embodiments, one or more of the steps described with respect to process 700 are performed (e.g., completely, partially, and/or the like) by object tracking system 505. Additionally, or alternatively, in some embodiments one or more steps described with respect to process 700 are performed (e.g., completely, partially, and/or the like) by another device or group of devices separate from or including object tracking system 505 such as perception system 402, planning system 404, localization system 406, and/or control system 408.

At 702, the process includes receiving from at least two sensor systems of a vehicle data characterizing respective detected objects. The data includes sensor data received from at least two sensors configured in the autonomous system 202 and associated with at least one object 104. For example, the data is received from at least one of camera 202a, LiDAR sensor 202b, radar sensor 202c, or microphone 202d, or a combination thereof. In some embodiments, the object 104 can be a stationary object or a moving object.

At 704, the process incudes generating a data structure based on the data characterizing the respective detected objects. The data structure includes a graph of nodes and edges connecting the nodes. A node represents a state of one of the respective detected objects at a particular time. The state can include a position, a velocity, an acceleration, a heading, a heading rate (e.g., an angular velocity), an existence probability, a physical appearance and/or a class of the object. An edge represents a hypothetical transition of the state of the one of the respective detected objects. Edges are considered as valid or invalid state transitions. Invalid state transitions can be determined based on spatiotemporal constraints. For example, state transitions within the same time frame can be invalid because different nodes cannot belong to the same object at the same time. Additionally, temporal constraints can be configured such that a node cannot have an edge to another node in a future time frame if the position of the object is outside of (e.g., too far away) the physically possible range for the node of the earlier time frame to travel to. For example, an edge connecting a first node associated with a state of a first object is an invalid edge, if the edge connects the first node to a second node associated with a state of a second object, e.g., an object that is different than the object associated with the first node and thus two different objects have been detected and misidentified as the same object. An edge is considered a valid edge when it connects nodes associated with the same object and thus represents transitions of a first object from a first state to a second data of the first object. For example, a valid transition state can include an optimal transition state determined using a linear assignment solver configured to generate the graph of nodes and edges at 704. Costs for each edge are computed. Each edge cost can represent a likelihood that a later node continues from an earlier node, and thus represents the same underlying object. Based on the constraint that a single node can continue forward in time by at most one node (e.g., the same object cannot split into multiple objects over time), the solver can be configured to solve the graph as a bipartite matching problem to minimize the total likelihood of state transitions among all nodes in the graph.

In some embodiments, the hypothetical transition of the state of the one of the respective detected objects is a transition between a first state at a current time and a second state at a future time.

At 706, the process includes applying a predictive model to the data structure. The predictive model is trained in a machine learning process as described herein to receive the velocity, heading, and physical appearance as inputs and produce an identification of a set of nodes and edges, e.g., at least one node and at least one edge, corresponding to the one of the respective detected objects. The predictive model can be trained using 3D annotations to receive multiple frames of Lidar point cloud data and camera data and to output 3D object detection with associated object states (e.g., velocity, heading, acceleration of a detected object), object appearance (e.g., the object's shape and/or features), as well as a classification of a type of object (e.g., a vehicle, a bicycle, or a pedestrian).

The predictive model identifies node and edges which can correspond to states of the same object that was detected by the sensors 202. The predictive model identifies an edge to connect nodes associated with the object detected by the sensors 202, e.g., different instances in time of the same object. The output of the predictive model, e.g., the identification of a set of nodes and edges, corresponds to a hypothetical trajectory to be performed by the one of the respective detected objects. For example, the identification includes at least one of a velocity, a heading, and/or a physical appearance of the detected object.

In some embodiments, instances of sensor data associated with particular times is acquired, stored, or otherwise received and indexed according to the particular time. In this way, the predictive model is utilized the indexed sensor data to predict edges as hypothetical transitions in state of the object between two particular times.

In some embodiments, producing the identification of the set of nodes and edges corresponding to the one of the respective detected objects includes applying a smoothing function and outputting the set of nodes and edges based on the applied smoothing function. For example, a Kalman filter can be applied to improve the accuracy of the state determinations.

At 708, the process includes providing data based on the identification of the set of nodes and edges to a planning system of the vehicle, such as the planning system 404. In some embodiments, the generating, applying, and providing are performed continuously as data characterizing the respective detected objects is received. For example, every instance of received sensor data causes the generating, applying, and providing operations to be performed dynamically and continuously so that predicted trajectories of detected objects are constantly being determined and incorporated by the planning system 404.

At 710, the process includes causing the vehicle 102 to operate based on providing the data to the planning system 404 of the vehicle.

Figure 8:
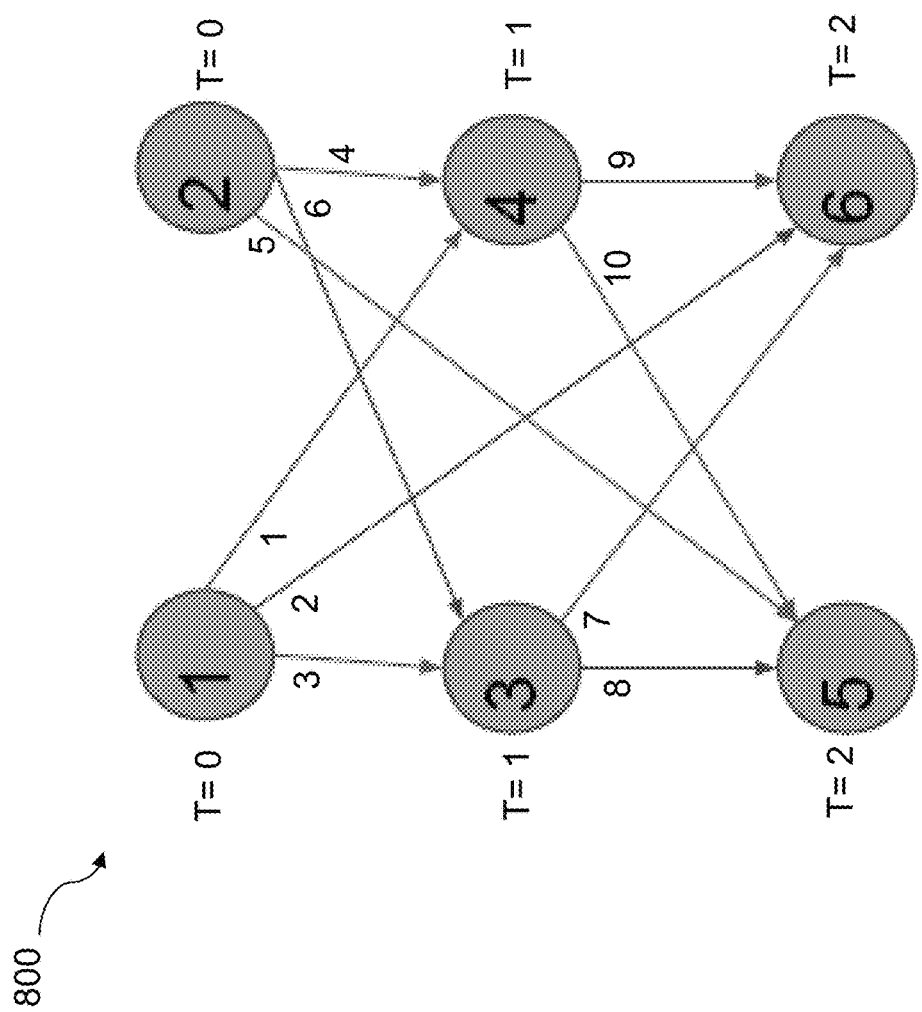
FIG. 8 is a diagram of an example graph generated by the object tracking system described herein.

Referring now to FIG. 8, a graph 800 includes six nodes, e.g., nodes 1-6. The nodes are respectively associated with a state of at least one detected object and the edges connecting pairs of nodes are associated with valid hypothetical transitions of the objects velocity, heading, or physical appearance. For example, the edges can represent a respective valid hypothetical transition in state of an object that is located in proximity of the vehicle and for which the sensors of the vehicle have acquired sensor data as described herein. The graph 800 corresponds to a plurality of tracklets for a particular object. A tracklet can be associated with or defined as at least one edge and can include a plurality of edges as described herein. A tracklet is one or more hypothetical transitions in state that have been determined to be valid transitions in state for the respective detected object. In some embodiments, a tracklet can include a short sequence of measurements determined to have originated from the same target or object. The sequence of measurements can be filtered to ensure estimations include a state with a minimal amount of covariance.

The valid tracklets can be fused or stitched together to form a trajectory of the object. Each node in a graph can include a tracklet because each node already contains all the states (e.g., a position, a velocity, a heading) of the object. In some embodiments, the stitching can be associated with or defined as joining two or more valid tracklets. For example, as shown in FIG. 8, the state of a first object at an initial time (e.g., T=0) is identified by node 1 and the state of a second object at T=0 is identified by node 2. Based on the received sensor data, the object tracking system 505 generates a data structure 800 that includes a first set of hypothetical transitions for nodes 1 and 2 at future times T=1 and T=2. The data structure 800 is generated to include valid hypothetical state transitions as edges for future times T=1 and T=2, such as edges 1-10. The object tracking system 505 can determine multiple possible solutions. For example, node 1, node 4, and node 5 via edges 1 and 10 can represent one valid tracklet solution. Node 2, node 3, and node 6 via edges 6 and 7 can represent a second valid tracklet solution. The object tracking system 505 can further determine, based on one or more cost parameter settings, that the optimized solution or tracklet for each object considering all hypothetical state transitions jointly is one in which a first object trajectory is associated with node 1 and node 6 via edge 2 and a second object trajectory is associated with node 2, node 3, and node 5 via edges 6 and 8.

The techniques for object tracking described herein can provide technical solutions, which can provide technical advantages over existing object tracking systems. The advantages can include, but are not limited to, increased processing times and accuracy for object determination in autonomous vehicle operating environments. The object tracking systems described herein can also provide improved detection of moving objects compared to static objects in either sparse or dense operating environments. As a result, more accurate object detection data can be provided to the planning system of the vehicle and the vehicle can be operate more safely in a larger variety of operating conditions in which the objects can be present.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    receiving, using at least one processor, from at least two sensor systems of a vehicle, data characterizing respective detected objects;
    generating, using the at least one processor, a data structure based on the data characterizing the respective detected objects, the data structure including a graph of nodes and edges, wherein a node of the nodes represents a state of one of the respective detected objects at a particular time, the state including a velocity, heading, and physical appearance, and wherein an edge of the edges represents a hypothetical transition in state of the one of the respective detected objects;
    applying, using the at least one processor, a predictive model to the data structure, wherein the predictive model is trained to receive the velocity, heading, and physical appearance as inputs and produce an identification of a set of nodes and edges corresponding to the one of the respective detected objects;
    providing, using the at least one processor, data based on the identification of the set of nodes and edges to a planning system of the vehicle; and
    causing the vehicle to operate based on providing the data to the planning system of the vehicle.

2. The method of claim 1, wherein the hypothetical transition in state of the one of the respective detected objects is between a first state at a current time and a second state at a future time.

3. The method of claim 1, wherein the generating, applying, and providing are performed continuously as data characterizing the respective detected objects is received.

4. The method of claim 1, wherein the identification of the set of nodes and edges corresponds to a hypothetical trajectory to be performed by the one of the respective detected objects.

5. The method of claim 1, wherein the data structure can be generated based on a user-defined processing window parameter defining a period of time in which the data characterizing the respective detected objects is used to generate the data structure.

6. The method of claim 1, wherein producing the identification of the set of nodes and edges corresponding to the one of the respective detected objects includes applying a smoothing function and outputting the set of nodes and edges based on the applied smoothing function.

7. The method of claim 6, wherein the one of the respective detected objects is a moving object.

8. The method of claim 6, wherein the one of the respective detected objects is a static object.

9. A system comprising:
    at least one processor, and
    at least one non-transitory storage media storing instructions that, when executed by the at least one processor, cause the at least one processor to:
        receive from at least two sensor systems of a vehicle, data characterizing respective detected objects;
        generate a data structure based on the data characterizing the respective detected objects, the data structure including a graph of nodes and edges, wherein a node of the nodes represents a state of one of the respective detected objects at a particular time, the state including a velocity, heading, and physical appearance, and wherein an edge of the edges represents a hypothetical transition in state of the one of the respective detected objects;
        apply a predictive model to the data structure, wherein the predictive model is trained to receive the velocity, heading, and physical appearance as inputs and produce an identification of a set of nodes and edges corresponding to the one of the respective detected objects;
        provide data based on the identification of the set of nodes and edges to a planning system of the vehicle; and
        cause the vehicle to operate based on providing the data to the planning system of the vehicle.

10. The system of claim 9, wherein the hypothetical transition in state of the one of the respective detected objects is between a first state at a current time and a second state at a future time.

11. The system of claim 9, wherein the generating, applying, and providing are performed continuously as data characterizing the respective detected objects is received.

12. The system of claim 9, wherein the identification of the set of nodes and edges corresponds to a hypothetical trajectory to be performed by the one of the respective detected objects.

13. The system of claim 9, wherein the data structure can be generated based on a user-defined processing window parameter defining a period of time in which the data characterizing the respective detected objects is used to generate the data structure.

14. The system of claim 9, wherein producing the identification of a set of nodes and edges corresponding to the one of the respective detected objects includes applying a smoothing function and outputting the set of nodes and edges based on the applied smoothing function.

15. The system of claim 14, wherein the one of the respective detected objects is a moving object.

16. The system of claim 14, wherein the one of the respective detected objects is a static object.

17. At least one non-transitory storage media storing instructions that, when executed by at least one processor, cause the at least one processor to:
   receive from at least two sensor systems of a vehicle, data characterizing respective detected objects;
   generate a data structure based on the data characterizing the respective detected objects, the data structure including a graph of nodes and edges, wherein a node of the nodes represents a state of one of the respective detected objects at a particular time, the state including a velocity, heading, and physical appearance, and wherein an edge of the edges represents a hypothetical transition in state of the one of the respective detected objects;
   apply a predictive model to the data structure, wherein the predictive model is trained to receive the velocity, heading, and physical appearance as inputs and produce an identification of a set of nodes and edges corresponding to the one of the respective detected objects;
   provide data based on the identification of the set of nodes and edges to a planning system of the vehicle; and
   cause the vehicle to operate based on providing the data to the planning system of the vehicle.

18. The at least one non-transitory storage media of claim 17, wherein the hypothetical transition in state of the one of the respective detected objects is between a first state at a current time and a second state at a future time.

19. The at least one non-transitory storage media of claim 17, wherein the instructions further cause the generating, applying, and providing to be performed continuously as data characterizing the respective detected objects is received.

20. The at least one non-transitory storage media of claim 17, wherein the identification of the set of nodes and edges corresponds to a hypothetical trajectory to be performed by the one of the respective detected objects.

\* \* \* \* \*